United States Patent Office 3,012,621
Patented Dec. 12, 1961

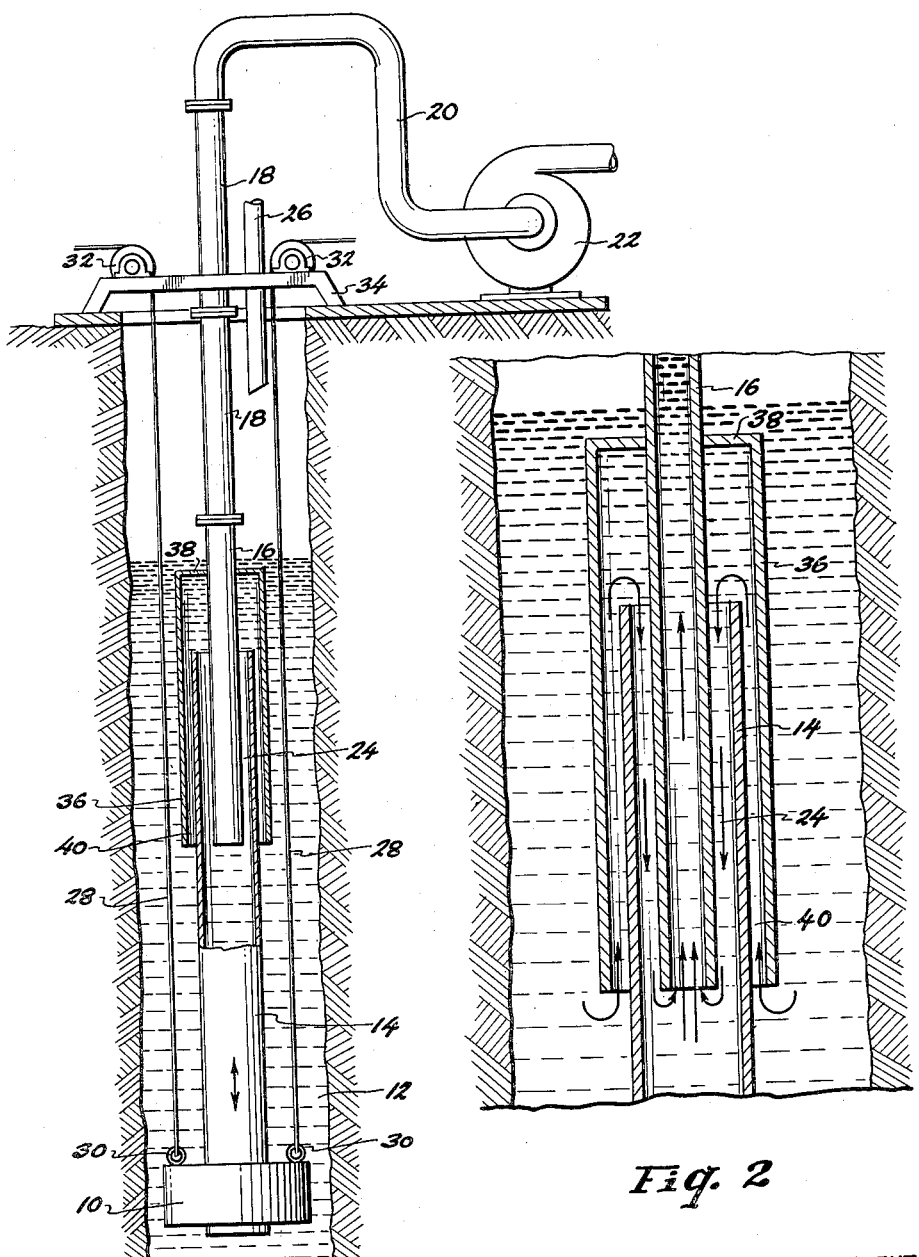

3,012,621
DEVICE FOR BORING UNDER REVERSED FLOW CONDITIONS
Léon Baud and Dietrich Taussig, Paris, France, assignors to Societe dite: Soletanche, societe a responsabilite limitee, Paris, France
Filed Nov. 20, 1957, Ser. No. 697,673
Claims priority, application France Nov. 29, 1956
1 Claim. (Cl. 175—213)

Various methods for boring under reversed flow conditions are known. The reference to reversed flow is due to the fact that the direction of flow of the circulating fluid is reversed with reference to that which is generally used in conventional methods.

In such conventional flow methods, the fluid is fed through a succession or string of rods down to the boring tool and, then, it rises inside the annular gap between the rods and the wall of the bore hole, while it carries along with it the waste material resulting from the perforation of the ground.

In the case of the methods operating under reversed flow conditions, the sludge is introduced at the upper end of the annular gap defined between the strings of rods and the bore hole and flows down to the lower end of the bore hole from which it rises inside the series or string of successive boring rods.

Such methods operating under reversed flow conditions are advantageous for the boring of large diameter bores or of continuous cuts, since they permit high upward flow speeds to be obtained inside the series of boring rods to ensure the lifting of large particles of waste material resulting from the formation of the bore hole, whereas the relatively large cross-section of the bore hole does not allow a sufficient upward flow speed to be obtained under direct flow conditions.

The reversed flow conditions are obtained by applying a suction to the upper end of the series of boring rods.

In accordance with known methods, the column formed by the boring rods which is rigid with the boring tool is connected with the suction pump to produce the desired reduced pressure in the column. Since the column is subjected to the same movement as the boring tool, the connecting means between the column and the pump must allow the relative movement between said parts. In the case where the boring tool and the column of rods rigid therewith have a reciprocating vertical movement imparted thereto, the connection of the column with the pump can be by way of a flexible or yieldable hose or tube.

On the other hand, if the boring tool is rotated or both axially reciprocated and rotated during the boring of the hole, and it is also necessary to impart vertical movement to the series of boring rods rigid with the boring tool so as to advance the latter as the depth of the bored hole increases, then the connection between the upper end of the column or series of boring rods and the suction pump includes a rotary and axially slidable joint.

The flexible or yieldable hose or tube used as the connection between the suction pump and the column, in the case of mere vertical reciprocation of the latter, is simple but bulky; while the rotary and axially slidable joint required in the connection between the suction pump and the column, in the case of combined rotary and vertical movements of the latter, is difficult and expensive to produce. In either case, the flexible hose or the rotary and axially slidable joint represents a point at which air is liable to enter the connection between the column and the suction pump and thereby unprime the latter.

Furthermore, since the suction column is subjected to the reciprocating and/or rotary movements imparted to the boring tool, it is difficult to provide a coupling between the several tubular rods of the column which is both sufficiently strong and sufficiently fluidtight.

My invention has for its object to provide apparatus for boring under reverse flow conditions, but avoiding the above disadvantages of existing apparatus of that kind.

According to an aspect of this invention, the boring tool and the suction column are independent of each other, which provides with reference to prior practice, the following advantages:

The suction column remains stationary while the boring tool reciprocates during operation, so that the suction column may be connected with the suction pump through a rigid pipe having easily manufactured static joints which can be made reliably fluid tight;

The fluidtightness between the several rods of the suction column is also obtained with much greater ease, since said column is no longer subjected to the stresses and to the shocks due to a rigid connection with the boring tool.

In accordance with an aspect of the present invention, a device for boring under reverse flow conditions comprises a stationary suction pipe extending downwardly into the bore hole and connected, at its upper end, to a suction pump, a boring tool at the bottom of the bore hole and having a vertical tubular element rigidly connected thereto, with the upper end portion of the tubular element having a larger diameter than the suction pipe and telescoping coaxially over the lower end portion of the suction pipe to define an upwardly opening annular clearance therebetween so that fluid in the bore hole forms an hydraulic seal in that annular clearance and flows upwardly through the tubular element and sucion pipe for removal of the boring refuse from the bore hole, while the tubular element and boring tool are independent of the stationary suction pipe and free to be moved relative to the latter by suitable actuating means, and an outer sleeve closed at its upper end and there secured to the suction pipe, with such outer sleeve extending downwardly around the tubular element and into the fluid in the bore hole to avoid the entry of air into the annular clearance without regard to the difference between the relatively low pressure created in the suction pipe by the pump and atmospheric pressure.

My invention will be readily understood through the reading of the following description, reference being made to the accompanying diagrammatic drawing, wherein:

FIG. 1 is a diagrammatic elevational view, partly broken away and in section, of a device embodying the present invention for boring under reverse flow conditions; and FIG. 2 is an enlarged sectional view illustrating the directions of flow in the device of FIG. 1.

Referring to the drawing in detail, it will be seen that a device embodying the present invention for boring under reverse flow conditions includes a boring tool 10 disposed at the bottom of the bore hole 12 and an open ended tubular element 14 extending vertically upward, and rigidly connected to the tool 10. A stationary suction pipe 16 has its upper end connected, for example, by successively secured together pipe sections 18, to the inlet 20 of a suitably driven suction pump 22.

At least the upper end portion of tubular element 14 has an inner diameter which is larger than the diameter of the lower end portion of suction pipe 16, and the upper end portion of tubular element 14 telescopes axially over the lower end portion of suction pipe 16 so as to define an upwardly opening, annular clearance 24 therebetween.

The boring fluid, for example, water, is introduced into bore hole 12 through a pipe 26.

The boring tool 10 is suitably actuated by any conventional transmission means forming no part of the present invention. For example, in the embodiment of the invention illustrated in FIG. 1, cables 28 are attached, as at 30, to the boring tool 10 and extend vertically upward from the latter to the top of bore hole 12 where the cables run over pulleys 32 supported by a suitable frame 34 on the way to a winch or other device (not shown) by which the cables 28 are simultaneously pulled and then released in order to effect vertical reciprocation of the boring tool.

When the suction pump 22 is operated, the pressure within the lower end portion of suction pipe 16 is lower than the pressure within bore hole 12. This relatively low pressure causes a flow of the boring fluid upwardly through tubular element 14 into suction pipe 16 for carrying along the refuse resulting from the operation of the boring tool. If the upper end of annular clearance 24 opens to the atmosphere, the relatively low pressure at the lower end of suction pipe 16 also tends to lower the level of the boring fluid within annular clearance 24. However, if the suction pipe 16 extends a sufficiently large distance into tubular element 14, and below the surface of the boring fluid in bore hole 12, the boring fluid will still occupy at least the lower portion of annular clearance 24 thereby to provide an hydraulic seal in that annular clearance preventing the entry of air into the lower end of suction pipe 16 and thereby avoiding unpriming of suction pump 22.

In order to make it unnecessary for the suction pipe 16 to extend a substantial distance into the tubular element 14, the boring device embodying the present invention further includes an outer sleeve 36 which is closed at its upper end, as at 38, and there secured to the stationary suction pipe 16. The outer sleeve 36 has a larger internal diameter than the diameter of tubular element 14 and telescopes downwardly over the latter to define an annular, downwardly opening clearance 40 therebetween.

It will be apparent that, with the arrangement embodying the invention, the upwardly opening annular clearance 24 between suction pipe 16 and tubular element 14 is made to communicate with the boring fluid in bore hole 12 by way of the downwardly opening annular clearance 40 so long as the lower end of outer sleeve 36 is disposed below the surface of the boring fluid, and even though the upper end of tubular element 14 is disposed above the surface of the boring fluid in the bore hole. Thus, as represented by the arrows on FIG. 2, the relatively low pressure produced at the bottom of suction pipe 16 by the operation of suction pump 22 causes boring fluid and refuse to flow upwardly through tubular element 14 and suction pipe 16 and, simultaneously, causes a flow of boring fluid upwardly through annular clearance 40 and then downwardly through annular clearance 24 in order to maintain the desired hydraulic seal between the stationary suction pipe 16 and the movable tubular element 14 carrying the boring tool 10.

As the boring progresses, that is, as the tool 10 and tubular element 14 move downwardly within bore hole 12, additional pipe sections 18 are added. Although the outer sleeve 36 is no longer essential for the formation of the desired hydraulic seal between tubular element 14 and suction pipe 16 as soon as the telescoping end portions of the suction pipe and tubular element are completely immersed in the boring fluid, the outer sleeve 36 still has the advantage of producing a baffled path for the circulation of fluid through the hydraulic seal, as previously described and illustrated in FIG. 2, and this baffled path results in a loss of head which ensures a preferential path for the boring fluid coming directly from the bore hole through tubular element 14 and carrying the refuse resulting from the operation of the boring tool.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claim.

What we claim is:

A device for boring under reverse flow conditions in a bore hole, comprising a stationary suction pipe extending downwardly into the bore hole, a suction pump connected to the upper end of said suction pipe, a boring tool at the bottom of the bore hole, a vertical tubular element rigidly connected to said boring tool, the upper end portion of said tubular element having a larger diameter than said suction pipe and telescoping coaxially over the lower end portion of said suction pipe to define an upwardly opening annular clearance therebetween so that fluid in the bore hole forms an hydraulic seal in said annular clearance and flows upwardly through said tubular element and suction pipe for removal of the boring refuse from the bore hole, while said tubular element and tool are independent of said stationary suction pipe and free to move relative to the latter, means for effecting the operative movement of said boring tool, and an outer sleeve closed at its upper end and there secured to said suction pipe, said outer sleeve extending downwardly around said tubular element and into the fluid in the bore hole to avoid the entry of air into said annular clearance without regard to the difference between the relatively low pressure created in said suction pipe by said pump and atmospheric pressure.

References Cited in the file of this patent

UNITED STATES PATENTS

| | | |
|---|---|---|
| 1,053,615 | Lewis | Feb. 18, 1913 |
| 2,251,916 | Cross | Aug. 12, 1941 |

FOREIGN PATENTS

| | | |
|---|---|---|
| 941,181 | Germany | Apr. 5, 1956 |